(12) United States Patent
Furuyama

(10) Patent No.: US 12,531,678 B2
(45) Date of Patent: Jan. 20, 2026

(54) RADIO WAVE MAP UPDATE DEVICE, RADIO WAVE MAP UPDATE METHOD, AND COMMUNICATION QUALITY IDENTIFYING DEVICE

(71) Applicant: DENSO CORPORATION, Kariya (JP)

(72) Inventor: Takahiro Furuyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 18/298,153

(22) Filed: Apr. 10, 2023

(65) Prior Publication Data

US 2023/0246758 A1 Aug. 3, 2023

Related U.S. Application Data

(63) Continuation of application No. PCT/JP2021/028655, filed on Aug. 2, 2021.

(30) Foreign Application Priority Data

Oct. 13, 2020 (JP) .................... 2020-172339

(51) Int. Cl.
*H04L 5/00* (2006.01)
*H04W 72/044* (2023.01)
*H04W 72/542* (2023.01)

(52) U.S. Cl.
CPC ............ *H04L 5/0035* (2013.01); *H04L 5/006* (2013.01); *H04L 5/0096* (2013.01); *H04W 72/046* (2013.01); *H04W 72/542* (2023.01)

(58) Field of Classification Search
CPC ...... H04L 5/0035; H04L 5/006; H04L 5/0096; H04L 1/0023; H04L 43/12; H04W 72/046;
(Continued)

(56) References Cited

U.S. PATENT DOCUMENTS

2009/0181664 A1* 7/2009 Kuruvilla ............ H04W 24/10
455/67.11
2011/0281526 A1* 11/2011 Matsuda ............ H04B 17/3913
455/67.11
(Continued)

FOREIGN PATENT DOCUMENTS

| JP | 2019022089 A | 2/2019 |
| JP | 2019140563 A | 8/2019 |

(Continued)

*Primary Examiner* — Abdullahi E Salad
(74) *Attorney, Agent, or Firm* — Harness, Dickey & Pierce, P.L.C.

(57) ABSTRACT

A radio wave map update device includes a storage unit, a receiving unit, and an update unit. The storage unit is configured to store a radio wave map that contains reference position information indicating a reference position, reference blockage information indicating a reference blockage situation of a communication with a first base station at the reference position, and reference communication quality information of a communication with the first base station or a second base station under the reference blockage situation at the reference position. The receiving unit is configured to receive communication quality information of the communication between a probe information transmitter mounted in a moving body and the first base station or the second base station. The update unit configured to update the reference communication quality information stored in the storage unit using the communication quality information.

15 Claims, 10 Drawing Sheets

(58) Field of Classification Search
CPC ..... H04W 72/542; H04W 4/40; H04W 24/08; H04W 16/18; H04W 24/10; H04B 17/373; H04B 17/3912
See application file for complete search history.

(56) References Cited

U.S. PATENT DOCUMENTS

| | | | |
|---|---|---|---|
| 2016/0353327 A1* | 12/2016 | Larsson | H04W 4/029 |
| 2017/0223733 A1* | 8/2017 | Nakata | H04W 72/51 |
| 2018/0255525 A1* | 9/2018 | Uchiyama | H04W 56/0015 |
| 2019/0036630 A1 | 1/2019 | Svennebring et al. | |
| 2019/0253948 A1 | 8/2019 | Nagura et al. | |
| 2020/0187083 A1 | 6/2020 | Shimizu et al. | |
| 2020/0412464 A1* | 12/2020 | Hamabe | H04B 17/27 |
| 2021/0227443 A1 | 7/2021 | Shimizu et al. | |

FOREIGN PATENT DOCUMENTS

| | | | |
|---|---|---|---|
| WO | WO 2019/101334 | * | 11/2017 |
| WO | WO-2019/101334 A1 | | 5/2019 |

* cited by examiner

FIG. 3

| REFERENCE POSITION INFORMATION | FREQUENCY INFORMATION [GHz] | CONNECTABLE BASE STATION ID | BLOCKAGE CASE No. | BLOCKED BASE STATION ID | CONNECTED BASE STATION ID | REFERENCE COMMUNICATION QUALITY INFORMATION [Mbps] |
|---|---|---|---|---|---|---|
| X1, Y1 | 28 | 100 200 300 | 1000 | - | 100 | 100 |
| X1, Y1 | 28 | 100 200 300 | 1001 | 100 | 300 | 150 |
| X1, Y1 | 28 | 100 200 300 | 1002 | 100 300 | 200 | 50 |
| X2, Y2 | 28 | 200 300 | 2000 | - | 200 | 100 |
| ... | ... | ... | ... | ... | ... | ... |

RADIO WAVE MAP UPDATE DEVICE, RADIO WAVE MAP UPDATE METHOD, AND COMMUNICATION QUALITY IDENTIFYING DEVICE

CROSS REFERENCE TO RELATED APPLICATION

The present application is a continuation application of International Patent Application No. PCT/JP2021/028655 filed on Aug. 2, 2021, which designated the U.S. and claims the benefit of priority from Japanese Patent Application No. 2020-172339 filed on Oct. 13, 2020. The entire disclosures of all of the above applications are incorporated herein by reference.

TECHNICAL FIELD

The present disclosure relates to a device relative to a radio wave map such as a radio wave map update device and a radio wave map provider device that is a communication quality identifying device manly performed in a server, a radio wave map user device that is a communication quality identifying device mainly mounted in a moving body, and a method performed by these devices and a program executed by these devices.

BACKGROUND

As wireless communications become more widespread, there are more and more opportunities to communicate using wireless communications in a variety of locations. Especially in moving bodies such as automobiles, technologies for performing driving support and automated driving control using wireless communication are attracting attention, and so-called connectivity of vehicles is progressing. 5th generation mobile communication system (hereinafter, 5G) used in the communication method for vehicles is expected to achieve high-speed and large-capacity communication between the communication device mounted in the vehicle and the base station.

5G is a communication technology using a high-frequency band, but the high-frequency band is known that radio waves have high linearity. Since the communication quality of 5G having high linearity is affected by blockers on the communication path, it is required to perform communication in consideration of blockers on the communication path.

SUMMARY

A radio wave map update device according to a first aspect of the present disclosure includes: a storage unit configured to store a radio wave map that contains reference position information indicating a reference position, reference blockage information indicating a reference blockage situation of a communication with a first base station at the reference position, and reference communication quality information of a communication with the first base station or a second base station under the reference blockage situation at the reference position; a receiving unit configured to receive communication quality information of the communication between a probe information transmitter mounted in a moving body and the first base station or the second base station; and an update unit configured to update the reference communication quality information stored in the storage unit using the communication quality information.

A radio wave map update method according to a second aspect of the present disclosure is performed by a radio wave map update device. The radio wave map update device includes a storage unit configured to store a radio wave map that contains: reference position information indicating a reference position; reference blockage information indicating a reference blockage situation of a communication with a first base station at the reference position; and reference communication quality information of a communication with the first base station or a second base station under the reference blockage situation at the reference position. The radio wave map update method includes: receiving communication quality information of the communication between a probe information transmitter mounted in a moving body and the first base station or the second base station; and updating the reference communication quality information stored in the storage unit using the communication quality information.

A computer program product according to a third aspect of the present disclosure executable by a radio wave map update device. The radio wave map update device includes a storage unit configured to store a radio wave map that contains: reference position information indicating a reference position; reference blockage information indicating a reference blockage situation of a communication with a first base station at the reference position; and reference communication quality information of a communication with the first base station or a second base station under the reference blockage situation at the reference position. The computer program product is stored on at least one non-transitory computer readable medium and comprises instructions configured to, when executed by at least one processor, cause the at least one processor to: receive communication quality information of the communication between a probe information transmitter mounted in a moving body and the first base station or the second base station; and update the reference communication quality information stored in the storage unit using the communication quality information.

A communication quality identifying device according to a fourth aspect of the present disclosure includes: a storage unit configured to store a radio wave map that contains reference position information indicating a reference position, reference blockage information indicating a reference blockage situation of a communication with a first base station at the reference position, and reference communication quality information of a communication with the first base station or a second base station under the reference blockage situation at the reference position; a planned position information acquiring unit configured to acquire planned position information that indicates a planned position of a moving body in which a radio wave map user device configured to communicate with the first base station or the second base station is mounted; a blockage prediction unit configured to predict an occurrence of blockage of a communication between the radio wave map user device and the first base station caused by a movable blocker at the planned position information, and generate predicted blockage information indicating a predicted blockage situation of the blockage; a radio wave map determination unit configured to determine the reference position information corresponding to the planned position information, and determine the reference blockage information indicating the reference blockage situation corresponding to the predicted blockage situation; and a communication quality identifying unit configured to identify the reference communication quality information corresponding to the reference position information and the reference blockage information.

A communication quality identifying method according to a fifth aspect of the present disclosure is performed by a communication quality identifying device configured to identify communication quality contained in a radio wave map. The communication quality identifying device includes a storage unit configured to store the radio wave map that contains reference position information indicating a reference position, reference blockage information indicating a reference blockage situation of a communication with a first base station at the reference position, and reference communication quality information of a communication with the first base station or a second base station under the reference blockage situation at the reference position. The communication quality identifying method includes: acquiring planned position information that indicates a planned position of a moving body in which a radio wave map user device configured to communicate with the first base station or the second base station is mounted; predicting an occurrence of blockage of a communication between the radio wave map user device and the first base station caused by a movable blocker at the planned position information, and generating predicted blockage information indicating a predicted blockage situation of the blockage; determining the reference position information corresponding to the planned position information; determining the reference blockage information indicating the reference blockage situation corresponding to the predicted blockage situation; and identifying the reference communication quality information corresponding to the reference position information and the reference blockage information.

A computer program product according to a sixth aspect of the present disclosure is executable by a communication quality identifying device configured to identify communication quality contained in a radio wave map. The communication quality identifying device includes a storage unit configured to store the radio wave map that contains reference position information indicating a reference position, reference blockage information indicating a reference blockage situation of a communication with a first base station at the reference position, reference communication quality information of a communication with the first base station or a second base station under the reference blockage situation at the reference position. The computer program product is stored on at least one non-transitory computer readable medium and comprises instructions configured to, when executed by at least one processor, cause the at least one processor to: acquire planned position information that indicates a planned position of a moving body in which a radio wave map user device configured to communicate with the first base station or the second base station is mounted; predict an occurrence of blockage of a communication between the radio wave map user device and the first base station caused by a movable blocker at the planned position information, and generate predicted blockage information indicating a predicted blockage situation of the blockage; determine the reference position information corresponding to the planned position information; determine the reference blockage information indicating the reference blockage situation corresponding to the predicted blockage situation; and identify the reference communication quality information corresponding to the reference position information and the reference blockage information.

BRIEF DESCRIPTION OF THE DRAWINGS

FIG. 3 is a diagram illustrating a radio wave map generated and used in the first embodiment.

EMBODIMENTS

Comparative Example

Figure 1:
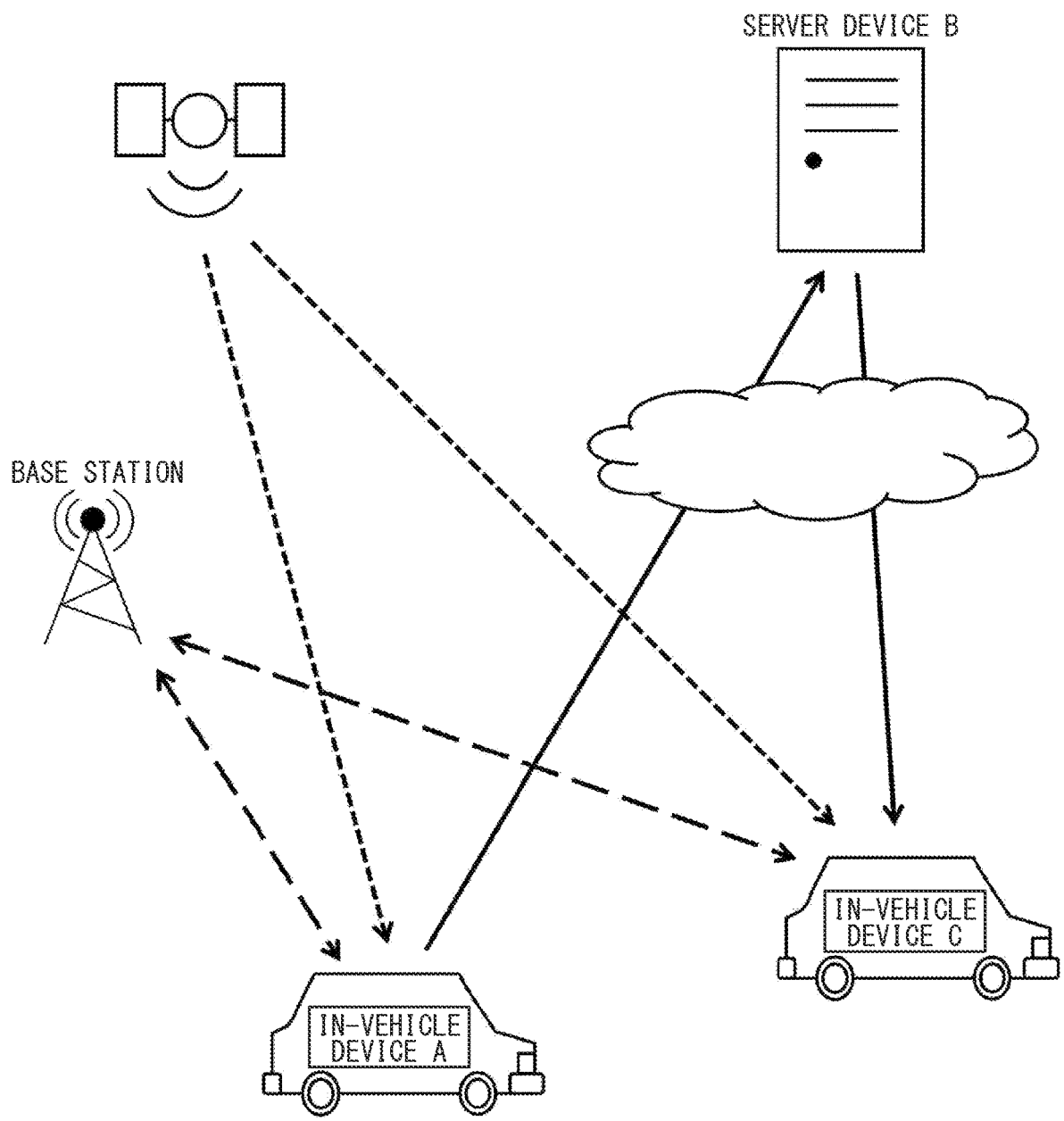
FIG. 1 is a diagram showing an overall configuration according to embodiments of the present disclosure.

A communication device according to a comparative example of the present disclosure uses past blockage history information. According to the communication device of comparative example, deterioration of communication quality due to the blockage is avoided by controlling the connection destination of the communication device when there is a risk of communication quality deterioration due to the blockage.

Here, the present inventors have found the following problems. Movable objects such as vehicles may exist, between the moving body such as the vehicle and the base station, as blockers on the communication path in addition to stationary objects such as buildings. However, the conventional technique does not take into account deterioration of the communication quality due to movable blockers, and accordingly the vehicle may not be able to perform communication with accurate prediction of the deterioration of the communication quality that will occur.

An embodiment of the present disclosure will be described below with reference to the drawings.

The present invention referred hereinafter indicates the invention described in the claims, and is not limited to the following embodiments. Further, at least words inside the double quotation means words and phrases described in the claims, and are not limited to the following embodiments.

Configurations and methods descried in dependent claims should be interpreted as arbitrary configurations and arbitrary methods within descriptions in independent claim. Configurations and methods of following embodiments corresponding to configurations and methods described in dependent claims, and configurations and methods described only in the following embodiments without descriptions in claims should be interpreted as arbitrary configurations and arbitrary methods in this disclosure. In a case that the scope of claims is broader than descriptions of the embodiments, configurations and methods described in the following embodiments are just examples of configurations and methods of the present disclosure, which should be interpreted as arbitrary configurations and arbitrary methods in this disclosure. In any cases, essential configurations and methods of this disclosure should be interpreted based on independent claims.

Any effects described in the embodiments are effects obtained by a configuration of an embodiment as an example of this disclosure, and are not necessarily effects of this disclosure.

When there are a plurality of embodiments, the configuration disclosed in each embodiment is not limited to each embodiment alone, and may be combined across the embodiments. For example, the configuration disclosed in one embodiment may be combined with other embodiments. The disclosed configurations in respective multiple embodiments may be partially combined.

The problem described in this disclosure is not a publicly known problem, but person including the inventor has independently found out, and is a fact that affirms the inventive step of the invention together with the configuration and method of the present disclosure.

1. Configurations Common to Each Embodiment

An overall configuration including devices common to each embodiment and their interrelationships will be described with reference to FIG. 1.

An in-vehicle device A and an in-vehicle device C mounted in a vehicle, which is a moving body, are connected with a server device B. The moving body refers to a movable object, and a travel speed is not limited. Naturally, this also includes a case where the mobile object is stopped. For example, the moving body includes, but is not limited to, vehicles, motorcycles, bicycles, pedestrians, ships, aircraft, and objects mounted on these. The term "mounted" includes not only a case where an object is directly fixed to the mobile object but also a case where an object is moved together with the mobile object although the object is not fixed to the mobile object. For example, the log management device 100 may be carried by a person on the moving body, or the log management device 100 may be mounted on a load placed on the moving body.

The in-vehicle device A corresponds to a probe information transmitter of the embodiments and is configured to transmit, via a communication network, probe information which is necessary to generate radio wave map.

The server device B corresponds to a radio wave map update device of the embodiments and is configured to receive the probe information from the in-vehicle device A via the communication network to and generate or update the radio wave map based on the probe information. The radio wave map is a set of states or estimation results of the communication quality at a specific position, for example, a mapping of the average bitrate (bps) per unit time for each grid point on a map.

The server device B corresponds to the radio wave map provider device of the embodiments. The server device B is configured to transmit the radio wave map, to the in-vehicle device C via the communication network, updated or generated by the radio wave map update device or a part of information contained in the radio wave map.

The in-vehicle device C corresponds to the radio wave map user device of the embodiments and is configured to use the information of the radio wave map receiving from the server device B.

The in-vehicle device A and the in-vehicle device C are configured to receive the location signals from the satellite positioning system such as GPS (Global Positioning System) to acquire the location information of their own.

The in-vehicle device A and the in-vehicle device C are configured to communicate with base stations.

In the following embodiments, 5G is used as the wireless communication method for communicating with the base station. Instead of 5G, the wireless communication network may be, for example IEEE802.11 (WiFi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), or 4G. Alternatively, Dedicated Short Range Communication (DSRC) may be used.

In addition to the aforementioned wireless communication methods, communication networks can also use wired communication methods. For example, a local area network (LAN), the Internet, or a fixed telephone line may be used. The wired communication methods are used in a case where the vehicle is parked in a parking lot at home or other place, a case where the vehicle is housed in a repair shop, and the like.

A combination of the wireless communication system and the wired communication system may be used as the wireless communication network. For example, the in-vehicle device A and a base station device may be connected with the base station via the 5G wireless communication system, and the base station device may be connected with other devices via the wired communication system such as a core line of a communication carrier or the Internet.

Although the in-vehicle device A and the in-vehicle device C are mounted in different vehicles in the present embodiment, they may be mounted in one vehicle. In such a case, the in-vehicle device A and the in-vehicle device C may be provided as different devices, or alternatively one in-vehicle device may have the function of the probe information transmitter 100 that is the in-vehicle device A and the function of the radio wave map user device 150 that is the in-vehicle device.

The server device B of the present embodiment has the functions of the radio wave map update device and the radio wave map provider device. However, these functions may be performed by different server devices.

2. First Embodiment (1) Configurations of In-Vehicle Devices (Probe Information Transmitter 1100 and Radio Wave Map User Device 1150)

Configurations of the in-vehicle devices of the present embodiment will be described with reference to FIG. 2. In the present embodiment, an example where the in-vehicle device has the functions of the probe information transmitter 1100 and the radio wave map user device 1150 (corresponding to "communication quality specifying device") will be described.

The in-vehicle device includes a location information acquiring unit 101, a wireless communication unit 102, a communication quality information acquiring unit 103, a blocking cause information acquiring unit 104, a control unit 105, a transmission unit 106, a planned position information acquiring unit 107, a receiving unit 108, and a storage unit 109. The control unit 105 is configured to build a communication interruption determination unit 110, a blockage prediction unit 111, a radio wave map determination unit 112, a communication quality identifying unit 113, and a communication control unit 114.

The in-vehicle device may include a general-purpose central processing unit (CPU), a volatile memory such as a RAM, a non-volatile memory such as a ROM, a flash memory, or a hard disk, various interfaces, and an internal bus connecting the constituents to each other. Then, by executing software on these hardware, the log management device 100 can be configured to perform the functions of each functional block described in FIG. 2. The same can be applied to the server device shown in FIG. 5 and the device which will be described in the second embodiment. Of course, the in-vehicle device may be implemented by dedicated hardware such as an LSI.

As the in-vehicle device, a form of an electronic control device (electronic control unit (hereinafter abbreviated to ECU)) as a semifinished product in the present embodiment is supposed, but the present disclosure is not limited thereto. For example, a form of a component may be a semiconductor circuit or a semiconductor module, and a form of a finished product may be a personal computer (PC), a smartphone, a cellular phone, or a navigation system. The in-vehicle device may include multiple ECUs in addition to a single ECU. For example, a communication ECU may perform communication with the outside. The probe information transmitter 1100 and the radio wave map user device 1150 may be configured by different ECUs.

Figure 2:
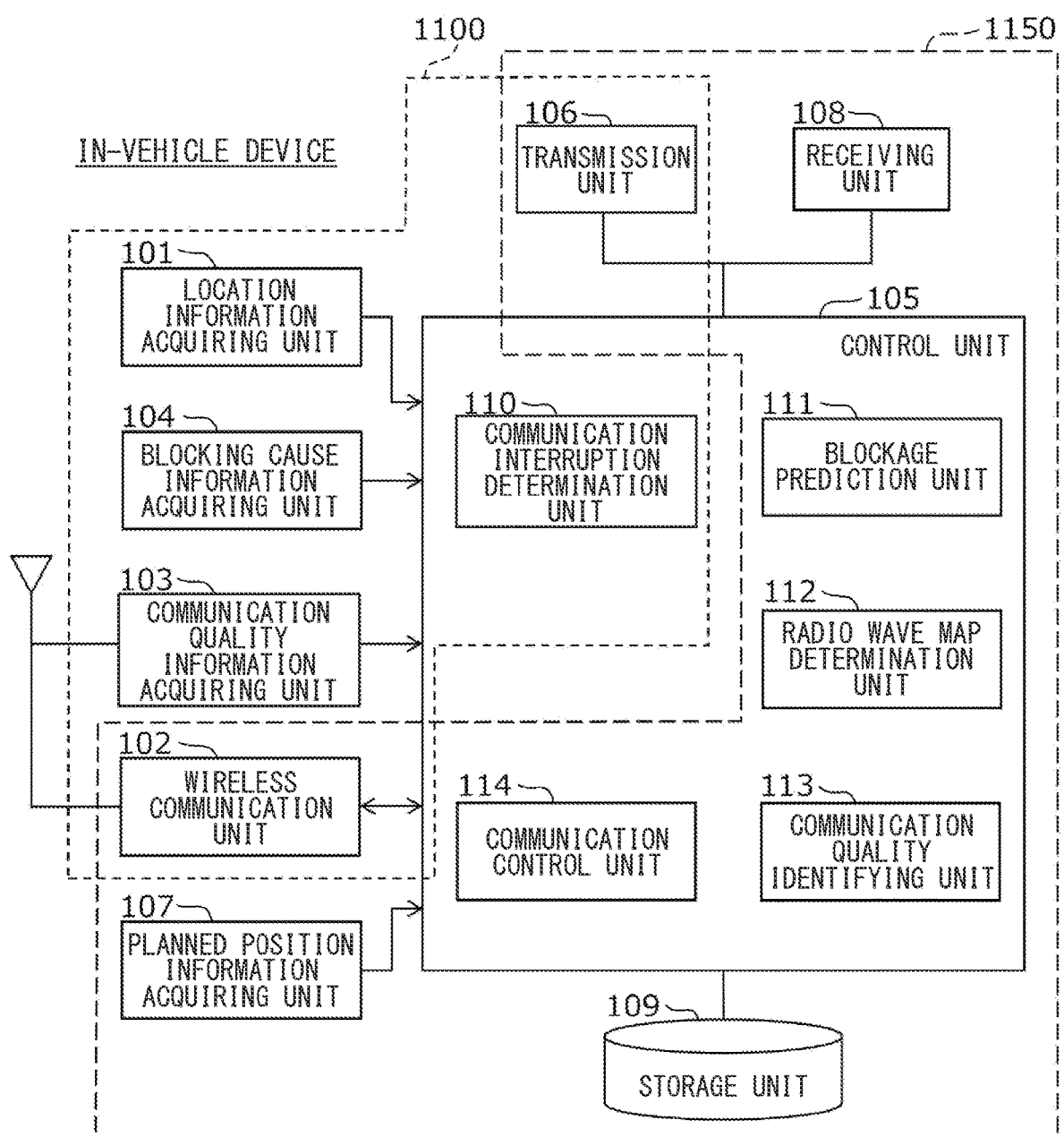
FIG. 2 is a block diagram illustrating a probe information transmitter and a radio wave map user device which are in-vehicle devices of the first embodiment.

The blocks of the in-vehicle device shown in FIG. 2 includes blocks mainly used by the probe information transmitter 1100, blocks mainly used by the radio wave map user device 1150, and blocks used by the probe information transmitter 1100 and the radio wave map user device 1150. Hereinafter, blocks used by the probe information transmitter 1100 will be described first, and then blocks used by the radio wave map user device 1150 will be described.

The blocks used by the probe information transmitter 1100 will be described.

The location information acquiring unit 101 is configured to acquire location information indicating the current position of the vehicle. The location information acquiring unit 101 mainly consists of a positioning receiver of a satellite positioning device. A positioning receiver corresponding to the satellite system to be used should be provided. The location information acquiring unit 101 includes devices configured to provide correction information used for correcting the location information in addition to the positioning receiver. For example, the location information acquiring unit 101 may include inertial sensors such as a gyro sensor and an acceleration sensor, a laser sensor, and a map information database.

The wireless communication unit 102 is configured to transmit necessary information to and receive necessary information from external communication device, e.g. the base station in the present embodiment, using wireless communication. In the present embodiment, the wireless communication unit 102 is a 5G communication device. However, the wireless communication unit 102 may be an LTE communication device, V2X communication device, or Wi-Fi communication device. 5G base station is assume as the external communication device that performs wireless communication with the wireless communication unit 102. However, the wireless communication unit 102 may be an AP (Access Point) when using Wi-Fi, and another vehicle or a roadside unit when using V2X. Of course, a plurality of communication methods may be used. When there are two or more connectable base stations, the base station with which the wireless communication unit 102 communicates is automatically selected.

The communication quality information acquiring unit 103 is configured to acquire communication quality information indicating the quality of wireless communication between the wireless communication unit 102 and the base station at the current position of the vehicle acquired by the location information acquiring unit 101. For example, the communication quality information acquiring unit 103 may be a device configured to measure the communication speed as the communication quality. The communication quality information acquiring unit 103 may be configured to acquire the communication quality information from an external communication device, for example.

The communication quality information indicates the state or estimated result of the wireless communication and includes RSSI, RSRP, RSRQ, SNR, SIR, BER, propagator, and channel propagation matrix in addition to an average bit rate per unit of time (bps), for example.

The communication quality information acquiring unit 103 may be configured to acquire information about the transmission status in the frequency band allocated to the uplink to acquire information for evaluating the reception quality of the uplink. For example, the average transmission bit rate per unit of time (bps) corresponds to such information. Alternatively, the propagation environment information acquiring unit 103 may be configured to receive, from the base station, RSSI, RISP, RSRQ of the reference signal measured by the base station. The radio wave map update device 1200 of the server device can generate or update the transmission radio wave map of the specific location on a map by using such information.

The communication quality information acquiring unit 103 may be configured to acquire information about the reception status in the frequency band allocated to the downlink to acquire information for evaluating the communication quality of the downlink. For example, such information includes RSSI, RSRP, and RSRQ of the reference signal. The radio wave map update device 1200 of the server device can generate or update the reception radio wave map of the specific location on a map by using such information.

In the following embodiments, an example where the communication quality information indicates the communication quality of uplink is described. However, the present disclosure may be applied to the communication quality of downlink. The communication quality information may indicate both the uplink communication quality and downlink communication quality.

The communication quality information acquiring unit 103 may have also functions of the wireless communication unit 102. The communication quality information acquired and output by the communication quality information acquiring unit 103 may be obtained as normalized relative values instead of absolute values of the measurement results of each value. For example, the propagation environment information may be a normalized value where the maximum speed that can be drawn under ideal communication conditions with no radio interference is 100 and the minimum is 0.

It is assumed that the communication quality information acquiring unit 103 is configured to acquire the communication quality information of the communication between the wireless communication unit 102 and one base station connected with the wireless communication unit 102. However, when there are two or more base stations that can wirelessly communicate with the wireless communication unit 102 at the current position of the vehicle, the communication quality information acquiring unit 103 may acquire the communication quality information for each base station.

The blocking cause information acquiring unit 104 is configured to acquire blocking cause information when the communication interruption determination unit 110 determines that the wireless communication between the wireless communication unit 102 and the connected base station is interrupted. The blocking cause information is information indicating a blocking object that is blocking the communication with the base station, for example, image information around the vehicle such as a still image or movie captured by the in-vehicle camera mounted in the vehicle. The blocking cause information may be image information in the direction of the base station whose communication was interrupted among the image information captured by the in-vehicle camera. The blocking cause information may be measurement information around the vehicle detected by LiDAR (Light Detection and Ranging) mounted in the vehicle, or information about another vehicle traveling around the vehicle received via vehicle-to-vehicle communication. The blocking cause information acquiring unit may be configured to acquire a combination of the above-described information as the blocking cause information.

The control unit 105 is configured to control the location information acquiring unit 101, the wireless communication unit 102, the communication quality information acquiring unit 103, the blocking cause information acquiring unit 104, and the transmission unit 106. The control unit 105 builds the communication interruption determination unit 110.

The communication interruption determination unit 110 is configured to determine whether the wireless communication between the wireless communication unit 102 and the connected base station (corresponding to a first base station) is interrupted based on the communication quality information acquired by the communication quality information acquiring unit 103. The communication interruption determination unit 110 may be configured to determine that the communication between the wireless communication unit 102 and the base station is interrupted when RLF (Radio Link Failure) happened more than a predetermined times, for example.

The transmission unit 106 is configured to transmit, to the radio wave map update device 1200 as the probe information, the location information acquired by the location information acquiring unit 101, the communication quality information acquired by the communication quality information acquiring unit 102, the blocking cause information acquired by the blocking cause information acquiring unit 104, and the determination result of the communication interruption determination unit 110. For example, in the present embodiment, the transmission unit 105 is configured to transmit the following information as the probe information.

(Probe Information)
Timestamp: Time (UTC) when the probe information was generated
Location information: location coordinate of the vehicle acquired by GPS or the like
Communication quality information: communication speed with the connected base station [Mbps]
Base station ID: ID of the connected base station
Blockage occurrence: whether the interruption of communication with the base station has occurred
Blocking cause information: information about surroundings of the vehicle at the time when the communication is interrupted The above-described base station ID indicates the base station with which the wireless communication unit 102 is currently communicating at the current position, and the communication quality information indicates the quality of the communication with the base station identified by the base station ID. It is desirable that the base station indicated by the base station ID, i.e. the connected base station, is the base station (corresponding to "second base station") whose communication is not blocked, but the base station ID may indicate the base station (corresponding to "first base station") whose communication is blocked.

The probe information other than the above information may be transmitted. For example, when the communication with the base station is interrupted, the probe information may further contain the base station ID of the base station whose communication is interrupted. The probe information may be generated by a specific block other than the control unit 105.

According to the probe information transmitter 110 of the present embodiment, the blocking cause information is transmitted together with the communication quality information as the communication quality information. According to this, the radio wave map update device 1200 receiving the probe information can generate the radio wave map in accordance with the blockage situation caused by the blocker indicated by the blocking cause information.

Next, blocks used in the radio wave map user device 1150 will be described.

The planned position information acquiring unit 107 is configured to acquire planned position information indicating a scheduled position to which the vehicle is scheduled to move. For example, when the vehicle is an automated vehicle, the traveling route to the destination of the vehicle is calculated by the automated driving system in advance. Even when the vehicle is manually operated by the driver, the traveling route to the destination recommended by the navigation system is presented to the driver. The planned position information acquiring unit 107 is configured to acquire the planned position information based on the traveling route calculated by the automated driving system or the navigation system.

The planned position information is sufficient as long as it contains the information about the position to which the moving body plans to move, and may be the information indicating the destination of the moving body or the information indicating the traveling plan of the moving body. The planned position information acquiring unit 107 may be configured to acquire the planned position information from the external communication device or the like or acquire the planned position information by generating it.

The transmission unit 106 is configured to transmit the planned position information acquired by the planned position information acquiring unit 107 to the radio wave map provider device 1250. The transmission unit 106 may be configured to transmit a radio wave map request to request the radio wave map provider device 1250 to transmit the radio wave map in addition to the planned position information.

The receiving unit 108 is configured to receive the radio wave map from the radio wave map provider device 1250. The radio wave map received by the receiving unit 108 is the radio wave map for a position corresponding to the planned position information transmitted by the transmission unit 106.

The storage unit 109 is configured to store the received radio wave map received by the receiving unit 108. FIG. 3 shows an example of the radio wave map of the present embodiment.

In a case shown in FIG. 3, the radio wave map contains the reference position information, the frequency information, the connectable base station ID, the blockage case number, the blocked base station ID, the connected base station ID, and the reference communication quality information. Hereinafter, the connectable base station ID, the blocked base station ID, the connected base station ID, and the blockage case number are collectively referred to as reference blockage information. The radio wave map shown in FIG. 3 is just an example, and the reference blockage information may include other information, for example.

The reference position information is information indicating the reference position of a point where the reference communication quality can be obtained, and is ID indicating the latitude, longitude, and altitude or the grid point on the map. The reference position information may not be information indicating a particular point, and may be information indicating a range on a map (for example, a section of latitude X to Y). The frequency information indicates wireless frequency used for the wireless communication at the reference position indicated by the reference position information. The connectable base station ID indicates ID of a base station that is available for wireless communication at the reference position, that is, ID of the connectable base station. The blockage case number is a number indicating a blockage situation (hereafter, referred to as a reference blockage situation) at the reference position caused by the movable blocker. Difference numbers are assigned as the blockage case number based on the reference blockage situation. For example, the blockage case number may be a number assigned based on a combination of a blocked base station whose communication is blocked by the movable blocker and a base station whose communication is not blocked by the movable blocker. In a case shown in FIGS. 3, 1000, 1001, and 1002 are assigned as the blockage case numbers. The details of the reference blockage situations indicated by the blockage case numbers will be described later. The blocked base station ID indicates ID of the base station, among the connectable base station, whose communication is interrupted at the reference position by the movable blocker. The connected base station ID indicates ID of a base station wirelessly communicating at the reference position, that is, ID of the connected base station. The reference communication quality information indicates the reference quality of the communication with the connected base station at the reference position under the reference blockage situation.

The blockage situation includes an object that blocks the communication, an environment where the blockage occurs, and a fact whether the blockage occurs.

Figure 4A:
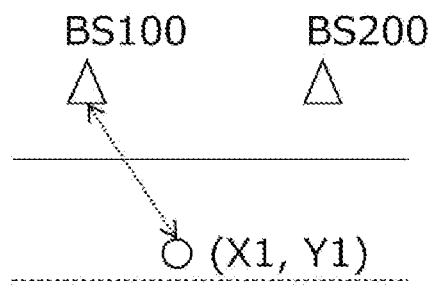
FIG. 4A is a diagram for explaining a blocked situation of the first embodiment.
Figure 4B:
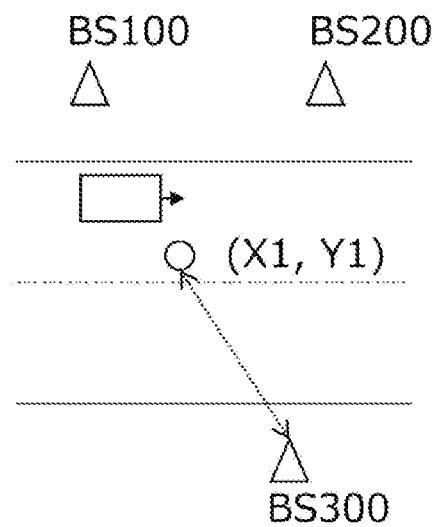
FIG. 4B is a diagram for explaining a blocked situation of the first embodiment.
Figure 4C:
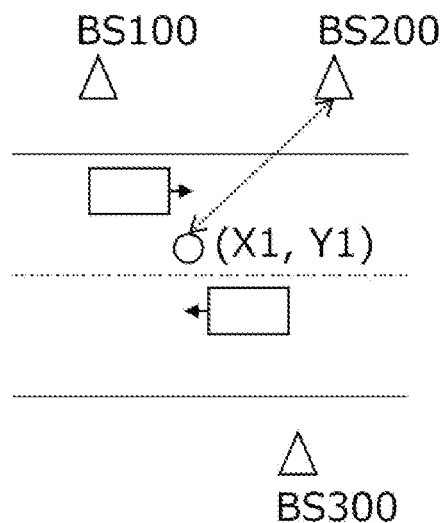
FIG. 4C is a diagram for explaining a blocked situation of the first embodiment.

FIG. 4 shows an example of the reference blockage situation corresponding to each blockage case number. FIG. 4A shows a case where the blockage case number shown in FIG. 3 is 1000, FIG. 4B shows a case where the blockage case number is 1001, and FIG. 4C shows a case where the blockage case number is 1002.

FIG. 4A indicates a situation where there is no movable blocker between the vehicle and the base stations BS100, BS200, BS300 at the reference position X1, Y1. The blockage situation where there is no blocker between the vehicle and any one of the base stations BS100, BS200, BS300 as shown in FIG. 4A is represented by the blockage case number 1000 in the present embodiment. In FIG. 4A, there is no base station whose communication is blocked, and the vehicle is wirelessly communicating with the base station BS100. Accordingly, when the reference position is (X1, Y1) and the blockage case number is (1000), the radio wave map shown in FIG. 3 does not contain the blocked base station ID and indicates (100) as the connected base station ID. According to the radio wave map shown in FIG. 3, the reference communication quality obtained when the reference position information is (X1, Y1) and the blockage case number is (1000) is 100 Mbps.

Also when there is a fixed blocker such as a building between the reference position and the base station, the blockage case number is 1000. This is because, when there is a fixed blocker that does not move, the radio wave map contains the reference communication quality assuming the presence of the fixed blocker.

In contrast, FIG. 4B shows a situation where there is a movable blocker between the reference position X1, Y1 and the base station BS1000. The blockage situation where the communication with the base station BS100 at the reference position is blocked and the communications with the base stations BS200, BS300 are not blocked is represented by the blockage case number 1001 in the present embodiment. When the reference position is (X1, Y1) and the blockage case number is (1001), the blocked base station ID is (100) and the connected base station ID is (300) in the radio wave map shown in FIG. 3. According to the radio wave map shown in FIG. 3, the reference communication quality obtained when the reference position information is (X1, Y1) and the blockage case number is (1001) is 150 Mbps.

FIG. 4C shows a situation where there are a movable blocker between the reference position X1, Y1 and the base station BS1000 and a movable blocker between the reference position and the base station BS300. The blockage situation where the communications with the base station BS100 and the base station BS300 at the reference position are blocked and the communication with the base station BS200 is not blocked is represented by the blockage case number 1002 in the present embodiment. When the reference position is (X1, Y1) and the blockage case number is (1002), the blocked base station ID is (100, 300) and the connected base station ID is (200) in the radio wave map shown in FIG. 3. According to the radio wave map shown in FIG. 3, the reference communication quality obtained when the reference position information is (X1, Y1) and the blockage case number is (1002) is 50 Mbps.

FIGS. 3, 4 just show examples of the radio wave map and the reference blockage situations, and the radio wave map and the reference blockage situations are not limited to them. For example, in the example shown in FIGS. 3, 4, the blockage case number is assigned based on a combination of the blocked base station whose communication is blocked by the movable blocker and the base station whose communication is not blocked by the movable blocker. However, the blockage case number may be assigned based on parameters other than the blocked base station and the unblocked base station. Other information may be contained as the reference blockage information.

For example, the radio wave map may contain, as the reference blockage information, the blocker type information that indicates the type of the reference blocker blocking the communication with the base station. For example, when the movable blocker is a small vehicle, although the communication quality is lower than the situation where there is no blocker, the wireless communication may be continued. In contrast, when the movable blocker is a large vehicle, the communication quality may significantly decrease, and the connected base station may be required to be changed. Since the communication quality and the connected base station may be changed depending on the type of the blocker as described above, it is desirable that the radio wave map contains information of the reference communication quality and the connectable base station ID according to the type of the blocker. The radio wave map may contain blocker type information as the reference blockage information, and the blockage case number may be assigned according to the type of the blocker indicated by the blocker type information. The blocker type information may contain information indicating the size, shape, and material of the blocker, for example. When the blocker is a vehicle, the blocker type information may be vehicle model information.

In another example, the radio wave map may contain, as the reference blockage information, reference blocked antenna information indicating a reference antenna whose communication with the base station is blocked by a movable blocker. For example, when two or more antennas are used for the wireless communication at the reference position, the antennas may include an antenna (hereinafter, reference blocked antenna) whose communication is blocked by the blocker and an antenna whose communication is not blocked by the blocker. Since the communication quality and the connected base station may change depending on the numbers or a combination of the blocked antenna and non-blocked antenna, it is desirable that the radio wave map contains the reference communication quality and the connectable base station ID according to the numbers and the combinations of the blocked antenna and the non-blocked antenna. The radio wave map may contain reference blocked antenna information as the reference blockage information, and the blockage case number may be assigned according to the antenna indicated by the reference blocked antenna information.

The reference blocked antenna information indicating the reference antenna whose communication is blocked may directly indicate the antenna whose communication is blocked or indirectly indicate the blocked antenna by indicating the non-blocked antenna. The reference blocked antenna information may be information of the number and the combination of the blocked antennas instead of information identifying the antenna whose communication is blocked.

Alternatively, the reference blockage information may be information only containing whether the presence or absence of blockage without the connectable base station ID, the connected base station ID, and the blocked base station ID.

The control unit 105 is configured to control the transmission unit 106, the planned position information acquiring unit 107, the receiving unit 108, and the storage unit 109. The control unit 105 is configured to build a blockage prediction unit 111, a radio wave map determination unit 112, a communication quality identifying unit 113, and a communication control unit 114.

The blockage prediction unit 111 is configured to predict a that communication between the radio wave map user device 1150 and the base station will be blocked by the movable blocker at the planned position of the vehicle acquired by the planned position information acquiring unit 107. The blockage prediction unit 111 is further configured to predict a blockage situation (hereinafter, predicted blockage situation) which will occur at the planned position of the vehicle, and generate predicted blockage information indicating the predicted blockage situation. The generated predicted blockage information is output to the radio wave map determination unit 112.

The blockage prediction unit 111 may be configured to predict the occurrence of the blockage and the predicted blockage situation from information related to planned positions of other vehicles received via Vehicle-to-Vehicle communication or Vehicle-to-infrastructure communication, for example. In such cases, the planned position information acquiring unit 107 is configured to acquire the planned position information (corresponding to a second planned position information) indicating the planned position of the other vehicle in addition to the planned position information (corresponding to a first planned position information) indicating the planned position of the subject vehicle. The blockage prediction unit 111 is configured to predict, based on the planned position information of the subject vehicle and the planned position information of the other vehicle, that the communication between the radio wave map user device 1150 and the base station will be blocked.

The radio wave map determination unit 112 is configured to determine, among the reference position information contained in the radio wave map, the reference position information corresponding to the planned position information acquired by the planned position information acquiring unit 107. The radio wave map determination unit 112 is further configured to determine the reference blockage information indicating the reference blockage situation corresponding to the predicted blockage situation predicted by the blockage prediction unit 111.

The phrase "corresponding to the location information" means the same position as the position indicated by the location information or near the position indicated by the location information. For example, when the reference position information indicates a range not a specific position, "corresponding to the location information" means being included in the range. The phrase "corresponding to the blockage situation" means the same situation as the blockage situation or similar to the blockage situation. For example, when the blockage situation indicates the blocked base station and/or the base station whose communication is not blocked, "corresponding to the blockage situation" means the base station matches the blocked base station and/or the unblocked base station.

For example, the blockage prediction unit 111 predicts that the communication between the radio wave map user device 1150 and the base station BS100 is blocked by the other vehicle at the planned position (X1, Y1), and the communications between the radio wave map user device 1150 and the base stations BS200, BS300 are not blocked at the planned position. In this case, the radio wave map determination unit 112 determines that the reference blockage information indicating the reference blockage situation represented by the blockage case number 1001 corresponds to the predicted blockage situation. Alternatively, when the blockage prediction unit 111 predicted that the communications between the radio wave map user device 1150 and the base stations BS100, BS200, BS300 at the planned position (X1, Y1) will not be blocked, the radio wave map determination unit 112 determines that the reference blockage situation represented by the blockage case number 1000 corresponds to the predicted blockage situation.

When the radio wave map contains the blocker type information as the reference blockage information, the blockage prediction unit 111 further predicts the type of the blocker based on the blocking cause information. The radio wave map determination unit 112 determines that the reference blockage information, which contains the blocker type information indicating the type of the reference blocker that matches the type of the blocker predicted by the blockage prediction unit 111, corresponds to the predicted blockage information.

When the radio wave map contains the reference blocked antenna information as the reference blockage information, the blockage prediction unit 111 further predicts the blocked antenna, among the antennas of the radio wave map user device 1150, whose communication will be blocked by the blocker. The radio wave map determination unit 112 determines that the reference blockage information, which contains the reference blockage information indicating the reference blocked antenna that matches the blocked antenna predicted by the blockage prediction unit 111, corresponds to the predicted blockage information.

The communication quality identifying unit 113 is configured to identify the reference communication quality information, among the reference communication quality information contained in the radio wave map, stored in association with the reference position information and the reference blockage information determined by the radio wave map determination unit 112.

The communication control unit 114 is configured to control the wireless communication of the radio wave map user device 1150 at the planned position based on the reference communication quality information identified by the communication quality identifying unit 113. For example, when the reference communication quality information identified by the communication quality identifying unit 113 indicates significantly low communication quality, the wireless communication unit 102 may need a long time to transmit data having large volume at the planned position. Therefore, the communication control unit 114 is configured to control to limit the communication or limit the transmission and reception of data with large volume at the planned position when the reference communication quality information indicates low communication quality.

For example, the blockage prediction unit 111 predicts that the other vehicle blocks the wireless communications between the vehicle and the base stations BS100, BS300 at the position (X1, Y1) where the vehicle is scheduled to move. The communication quality identifying unit 113 identifies that the communication quality obtained at the planned position (X1, Y1) is 50 Mbps based on the radio wave map shown in FIG. 3. When the communication quality is insufficient for transmitting data with 50 Mbps, the communication control unit 114 controls not to transmit the data at the position (X1, Y1) and to transmit the data at another position where a higher communication quality can be obtained.

According to the radio wave map user device 1150 of the present embodiment described above, the presence and the absence of the blockage at the position where the vehicle is scheduled to move are predicted, and information of the communication quality according to the blockage situation which may happen in the future. Accordingly, the communication quality can be predicted with high accuracy, and the wireless communication can be performed depending on the communication quality. The radio wave map user device 1150 of the present embodiment is a device for identifying the communication quality depending on the blockage situation, and accordingly it may be referred to as a communication quality identifying device.

(2) Configurations of Server Device (Radio Wave Map Update Device 1200, Radio Wave Map Provider Device 1250)

Configurations of the server device of the present embodiment will be described with reference to FIG. 5. In the present embodiment, an example where the server device has the functions of the radio wave map update device 1200 and the radio wave map provider device 1250 will be described.

The server device includes the storage unit 201, the receiving unit 202, the control unit 203, and the transmission unit 204. The control unit 203 builds the determination unit 210, the update unit 211, and the radio wave map extraction unit 212.

In the present embodiment, as the server device, a form of a server device as a finished product is supposed, but the present disclosure is not limited thereto. For example, a form of a component may be a semiconductor circuit or a semiconductor module, and a form of a finished product may be a personal computer (PC), a workstation, a smartphone, or a cellular phone.

Figure 5:
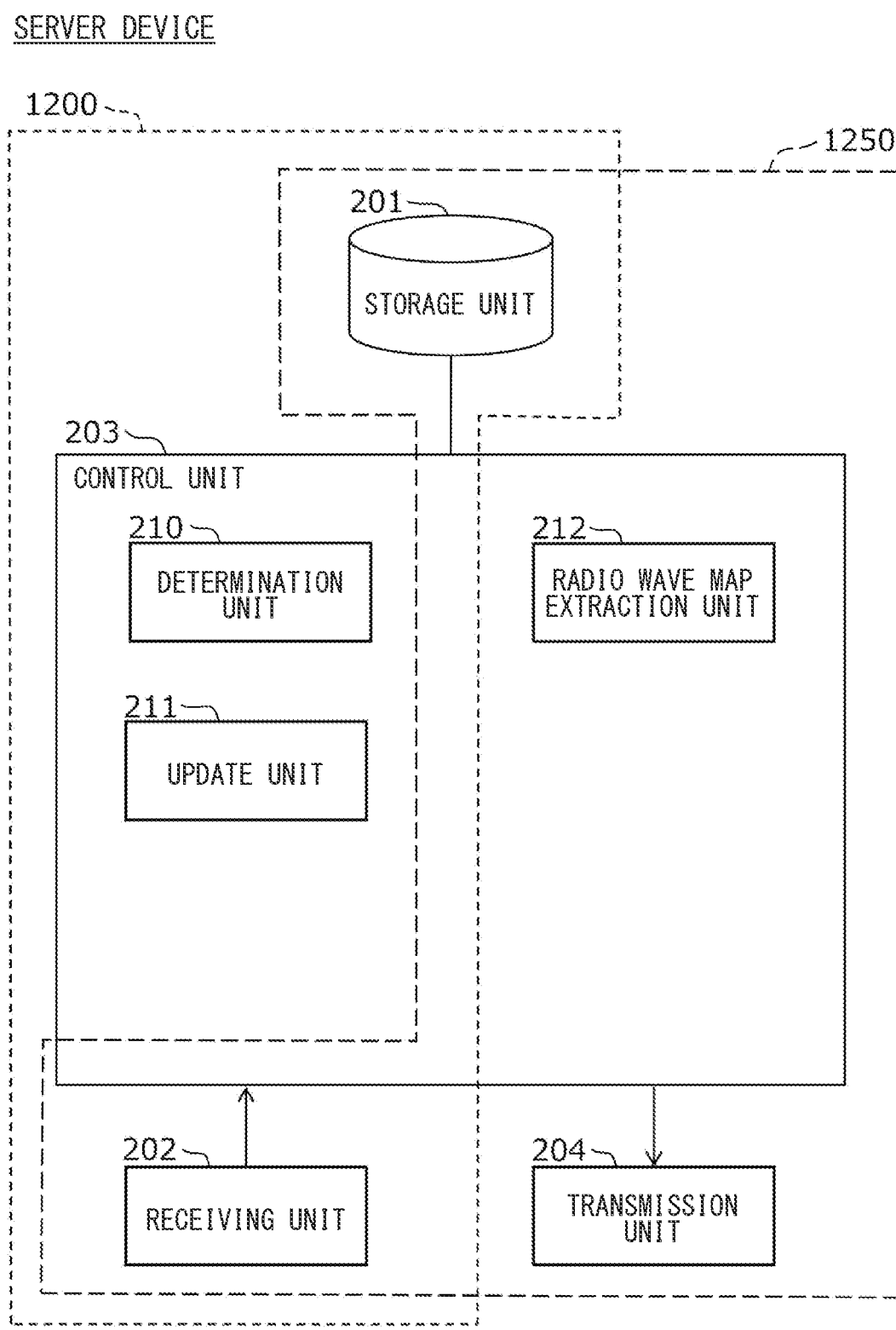
FIG. 5 is a block diagram illustrating a radio wave map update device and a radio wave map provider device which are in-vehicle devices of the first embodiment.

The blocks of the server device shown in FIG. 5 includes blocks mainly used in the radio wave map update device 1200, blocks mainly used in the radio wave map provider device 1250, and blocks used in both the radio wave map update device 1200 and the radio wave map provider device 1250. Hereinafter, blocks used by the radio wave map update device 1200 will be described first, and then blocks used by the radio wave map provider device 1250 will be described.

Blocks used in the radio wave map update device 1200 will be described.

The storage unit 201 is a memory that stores the radio wave map, and is composed of a non-volatile device such as an HDD or flash memory. As in the radio wave map described in FIG. 3, the radio wave map stored in the storage unit 201 contains the reference position information, the frequency information, the connectable base station ID, the blockage case number, the blocked base station ID, the connected base station ID, and the reference communication quality information.

The receiving unit 202 is configured to receive, from the probe information transmitter 1100, the probe information containing the location information of the vehicle, the blocking cause information, and the communication quality information. The probe information used in the present embodiment is the same as described above in (1).

The control unit 203 controls operations of the storage unit 201 and the receiving unit 202. The control unit 203 is configured to build the determination unit 210 and the update unit 211.

The determination unit 210 is configured to determine the reference position information corresponding to the location information contained in the probe information received by the receiving unit 202.

The determination unit 210 is configured to estimate the blockage situation of the communication between the probe information transmitter 1100 and the base station caused by the blocker indicated by the blocking cause information contained in the probe information, and determine the reference blockage information indicating the reference blockage situation corresponding to the estimated blockage situation. The estimation of the blockage situation of the communication includes estimations about the communication with which base station is blocked by the blocker, whether the blocker is the movable blocker, the type of the blocker, and/or the antenna blocked by the blocker.

For example, when the blocking cause information is image information of the captured surroundings of the vehicle and another vehicle is contained in the image information, the determination unit 210 estimates that the other vehicle contained in the image information is the blocker that blocks the communication with the base station and estimates the blockage situation from the relative positions of the subject vehicle, the other vehicle, and the base station. As the blockage situation, the base station whose communication is blocked by the other vehicle and the base station whose communication is not blocked by the other vehicle are estimated. Subsequently, the blockage case number indicating the reference blockage situation corresponding to the estimated blockage situation and the connected base station ID are determined.

When the determination unit 210 determines that the blockage is not caused by the movable blocker as a result of analysis of the blocking cause information such as image information, the blockage case number indicating the corresponding reference blockage situation is determined as 1000.

The update unit 211 is configured to update the reference communication quality information, among the reference communication quality information stored in the storage unit 201, corresponding to the reference position information and the reference blockage information determined by the determination unit 210 using the communication quality information contained in the probe information.

Any method can be used for the update. For example, the update unit 211 is configured to update the reference communication quality information to be a value calculated by averaging the reference communication quality information stored in the storage unit 201 using the communication quality information contained in the probe information. Alternatively, the reference communication quality information may be updated by replacing it with the communication quality information contained in the probe information.

Although the term "update" is used in the present embodiment, this may mean generating new radio wave map. That is, the radio wave map update device means a device configured to generate or update the radio wave map.

For example, when the determination unit 210 determines that the radio wave map does not contain the reference position information corresponding to the location information or the reference blockage information indicating the reference blockage situation corresponding to the blockage situation caused by the blocker indicated by the blocking cause information, the update unit 211 may generate (update) new radio wave map using the received probe information.

As described above, the radio wave map update device of the present embodiment is configured to generate or update the radio wave map that contains the reference blockage information indicating the reference blockage situation in addition to the reference position information and the reference communication quality information.

In the present embodiment, the radio wave map update device 1200 described above is configured to receive the communication quality information from the probe information transmitter 1100. However, the radio wave map update device 1200 may be configured to receive, from the base station, the communication quality information of the communication between the wireless communication unit 102 of the probe information transmitter 1100 and the base station. That is, the base station may be configured to acquire the communication quality information by measuring the reception power of the signal transmitted from the wireless communication unit 102, and transmit the information to the radio wave map update device 1200.

Next, blocks used in the radio wave map provider device 1250 will be described.

The storage unit 201 stores the radio wave map as described in the description of the radio wave map update device 1200.

The receiving unit 202 is configured to receive, from the radio wave map user device 1150, the planned position information of the vehicle in which the radio wave map user device 1150 is mounted. The receiving unit 202 may be configured to receive the radio wave map request together with the planned position information.

The control unit 203 is configured to control operations of the storage unit 201, the receiving unit 202, and the transmission unit 204. The control unit 203 is configured to build the radio wave map extraction unit 212.

The radio wave map extraction unit 212 is configured to extract the radio wave map containing the reference position information corresponding to the planned position information. When the receiving unit 202 received multiple pieces of the planned position information, the radio wave map extraction unit 212 extracts multiple radio wave maps corresponding to the pieces of the planned position information.

The transmission unit 204 is configured to transmit the radio wave map extracted by the radio wave map extraction unit 212 to the radio wave map user device 1150.

According to the radio wave map provider device 1250 of the present embodiment described above, the radio wave map for the position where the moving body is scheduled to move can be provided to the radio wave map user device 1150 mounted in the moving body. Further, since the radio wave map provided by the radio wave map provider device 1250 contains the reference blockage information indicating the reference blockage situation, the radio wave map which can be used in the blockage situation that may happen in the future can be provided.

Figure 6:
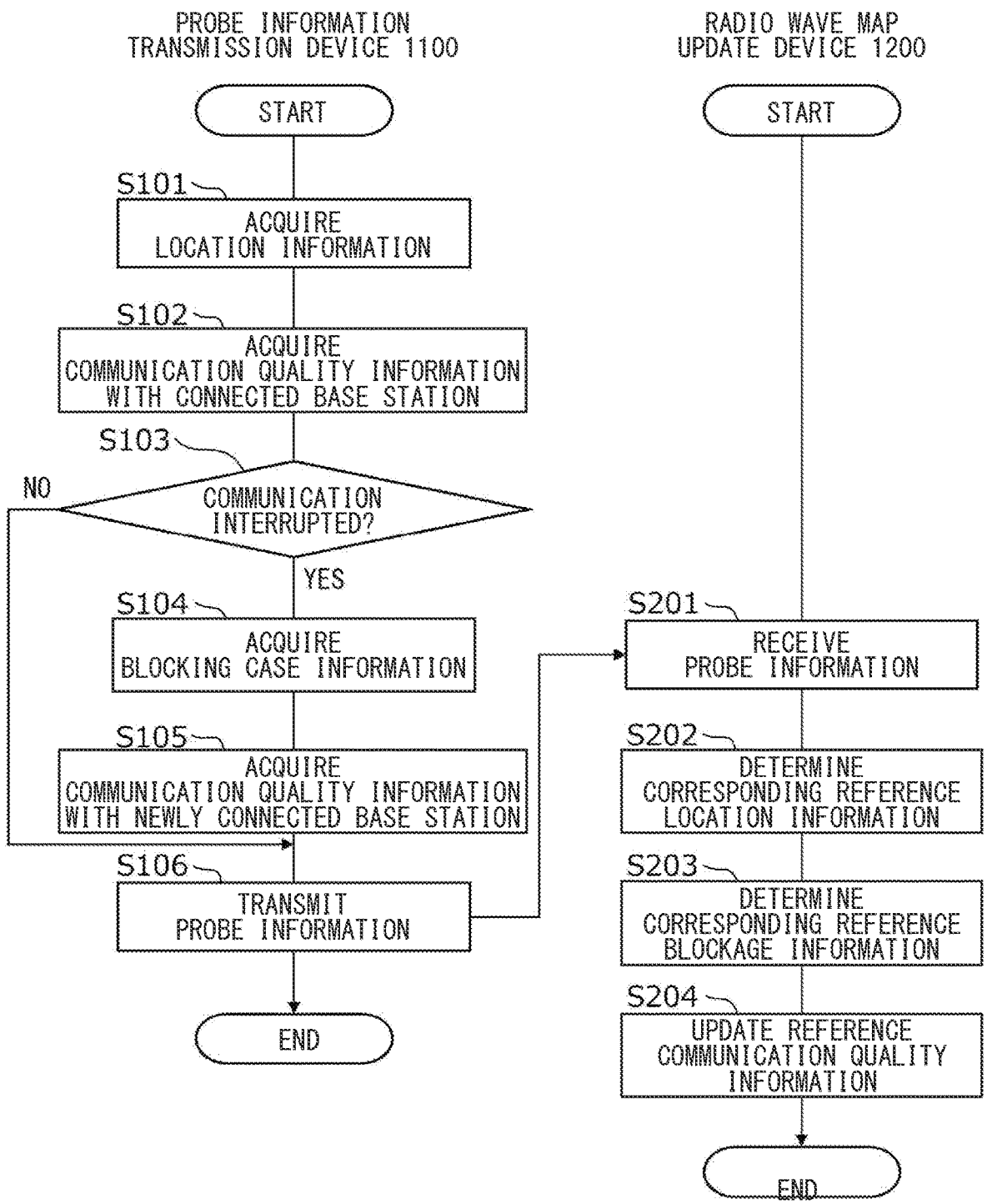
FIG. 6 is a flowchart showing operations of the probe information transmitter and the radio wave map update device according to the first embodiment.

(3) Operations of the Probe Information Transmitter 1100 and the Radio Wave Map Update Device 1200 in the Radio Wave Map Generation Process The probe information transmitter 1100 and the radio wave map update device 1200 involve in generating the radio wave map. The operations of the probe information 1 transmitter 100 and the radio wave map update device 1200 in the radio wave map generation process of the present embodiment will be described with reference to the flowchart shown in FIG. 6.

The following operations not only show the probe information transmission method executed by the probe information transmitter 1100, but also the processing procedures of the probe information transmission program that can be executed by the probe information transmitter 1100. The following operations not only show the radio wave map generation method executed by the radio wave map update device 1200, but also the processing procedures of the radio wave map generation program that can be executed by the radio wave map update device 1200. The order of the processes is not limited to the example shown in FIG. 6. That is, the order may be swapped as long as there is no restriction, such as a relationship where one step uses the result of the step before it.

In S101, the location information acquiring unit 101 of the probe information transmitter 1100 acquires the location information indicating the current position of the vehicle. In S102, the communication quality information acquiring unit 103 acquires the communication quality information of the communication with the base station connected at the current position of the vehicle.

In S103, the communication interruption determination unit 110 determines whether the communication with the connected base station is interrupted based on the communication quality information acquired by the communication quality information acquiring unit 103. When the communication interruption determination unit 110 determines that the communication was interrupted (S103: Yes), the blocking cause information acquiring unit 104 acquires the blocking cause information (S104). In S105, the communication quality information acquiring unit 103 acquires the communication quality information of the communication between newly connected base station in place of the base station whose communication was interrupted.

In S106, the transmission unit 106 transmits the location information acquired in S101, and the communication quality information of the communication with the newly connected base station as the probe information to the radio wave map update device 1200. When it is determined that the communication interruption occurred in S103, the blocking cause information acquired in S104 is also transmitted as the probe information.

When there is no connectable base station other than the base station whose communication was interrupted, the communication quality information may not be acquired in S105, and the probe information containing the communication quality information of the communication with the base station whose communication was interrupted may be transmitted as the probe information.

In S201, the receiving unit 202 of the radio wave map update device 1200 receives the probe information from the probe information transmitter 1100. In S202, the determination unit 210 determines the reference position information corresponding to the location information contained in the probe information. In S203, the determination unit 210 estimates the blockage situation of the communication between the vehicle and the base station caused by the blocker indicated by the blocking cause information contained in the probe information, and determine the reference blockage information indicating the reference blockage situation corresponding to the estimated blockage situation. In S204, the reference communication quality information corresponding to the reference position information determined by the determination unit 210 in S202 and the reference blockage information determined by the determination unit 210 in S203 is updated using the communication quality information contained in the probe information. As described above, the update of the reference communication quality information in S204 may be the generation of new radio wave map.

According to these processing, the radio wave map can be generated or updated in consideration of the blockage situation which will be caused by the movable blocker.

Figure 7:
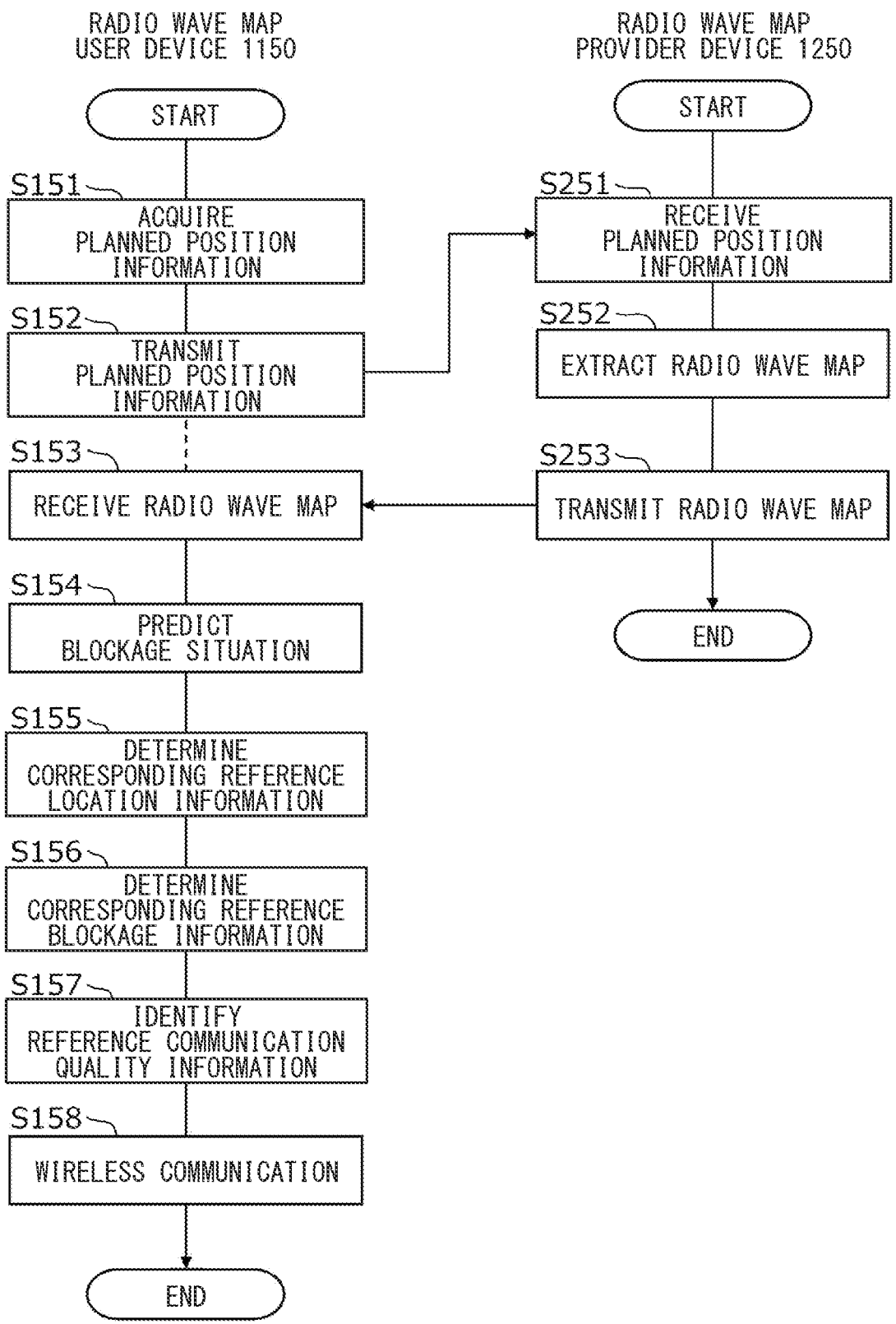
FIG. 7 is a flowchart showing operations of the radio wave map user device and the radio wave map provider device according to the first embodiment.

(4) Operations of the Radio Wave Map Provider Device 1250 and the Radio Wave Map User Device 1150 in the Radio Wave Map Using Process The radio wave map provider device 1250 and the radio wave map user device 1150 involve in using the radio wave map. The operations of the radio wave map provider device 1250 and the radio wave map user device 1150 in the radio wave map using process of the present embodiment will be described with reference to the flowchart shown in FIG. 7.

The following operations not only show the radio wave map providing method executed by the radio wave map provider device 1250, but also show a processing procedure of the radio wave map providing program that can be executed by the radio wave map provider device 1250. The following operations not only show the radio wave map acquiring/using method executed by the radio wave map user device 1150, but also the processing procedures of the radio wave map acquiring/using program that can be executed by the radio wave map user device 1150. These processes are not limited to the order illustrated in FIG. 7. That is, the order may be swapped as long as there is no restriction, such as a relationship where one step uses the result of the step before it.

In S151, the planned position information acquiring unit 107 of the radio wave map user device 1150 acquires the planned position information indicating the planned position of the vehicle. In S152, the planned position information acquired in S151 is transmitted to the radio wave map provider device 1250.

In S251, the receiving unit 202 of the radio wave map provider device 1250 receives the planned position information. In S252, the radio wave map extraction unit 212 extracts, among the radio wave maps stored in the storage unit 201, the radio wave map containing the reference position information corresponding to the planned position information. In S253, the transmission unit 204 transmits the radio wave map extracted in S252 to the radio wave map user device 1150.

In S153, the receiving unit 108 of the radio wave map user device 1150 receives the radio wave map. In S154, the blockage prediction unit 111: predicts the occurrence of the interruption of the communication with the base station at the planned position of the vehicle caused by the movable blocker, and the blockage situation; and generates the predicted blockage information. In S155, the reference position information corresponding to the planned position is determined. In S156, the reference blockage information indicating the reference blockage situation corresponding to the blockage situation predicted in S154. In S157, the reference communication quality information corresponding to the reference position information determined in S155 and the reference blockage information determined in S156 is identified. In S158, the communication control unit 114 controls the wireless communication by the wireless communication unit 102 using the reference communication quality information identified in S157.

3. Second Embodiment

In the first embodiment, the in-vehicle device that is the radio wave map user device is configured to predict the interruption of the communication between the vehicle and the base station based on the planned position of the vehicle. In the present embodiment, configurations in which the server device, instead of the in-vehicle device, is configured to predict the interruption of the communication between the vehicle and the base station will be described, mainly about the differences with the first embodiment.

(1) Configurations of In-Vehicle Devices (Probe Information Transmitter 2100 and Radio Wave Map User Device 2150)

Figure 8:
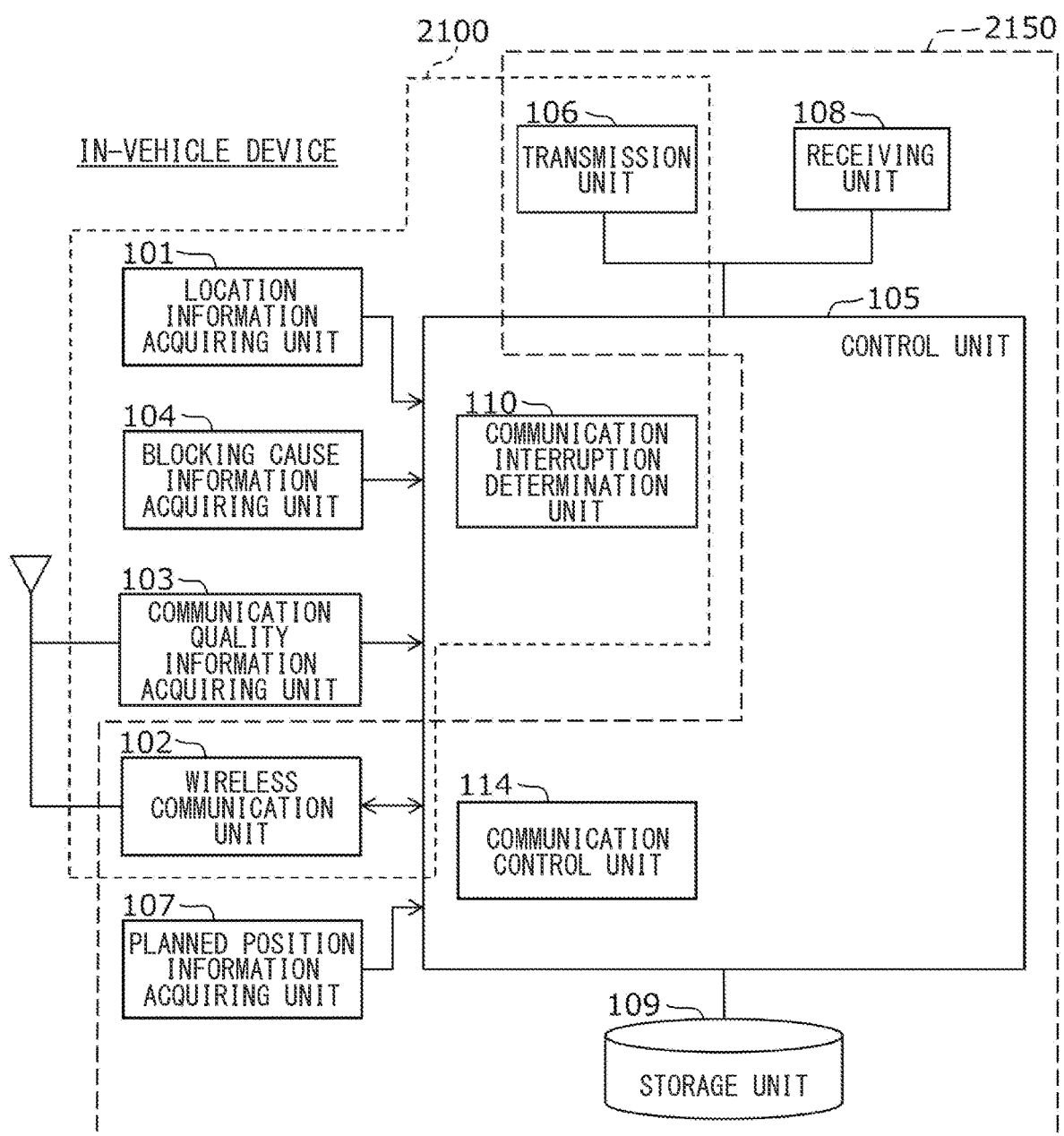
FIG. 8 is a block diagram illustrating a probe information transmitter and a radio wave map user device which are in-vehicle devices of the second embodiment.

Configurations of the in-vehicle devices of the present embodiment will be described with reference to FIG. 8. As shown in FIG. 8, the in-vehicle device of the present embodiment does not include the blockage prediction unit 111, the radio wave map determination unit 112, and the communication quality identifying unit 113, unlike the in-vehicle device shown in FIG. 2. The configurations of the probe information transmitter 2100 of the present embodiment is the same as the probe information transmitter 1100 of the first embodiment, and the explanation is omitted.

The receiving unit 108 of the radio wave map user device 2150 of the present embodiment is configured to receive the reference communication quality information for the planned position information transmitted by the transmission unit 106. The storage unit 109 is configured to store the reference communication quality information received by the receiving unit 108.

The communication control unit 114 configured to control the wireless communication performed by the wireless communication unit 102 based on the reference communication quality information stored in the storage unit 109.

(2) Configurations of Server Device (Radio Wave Map Update Device 2200, Radio Wave Map Provider Device 2250)

Figure 9:
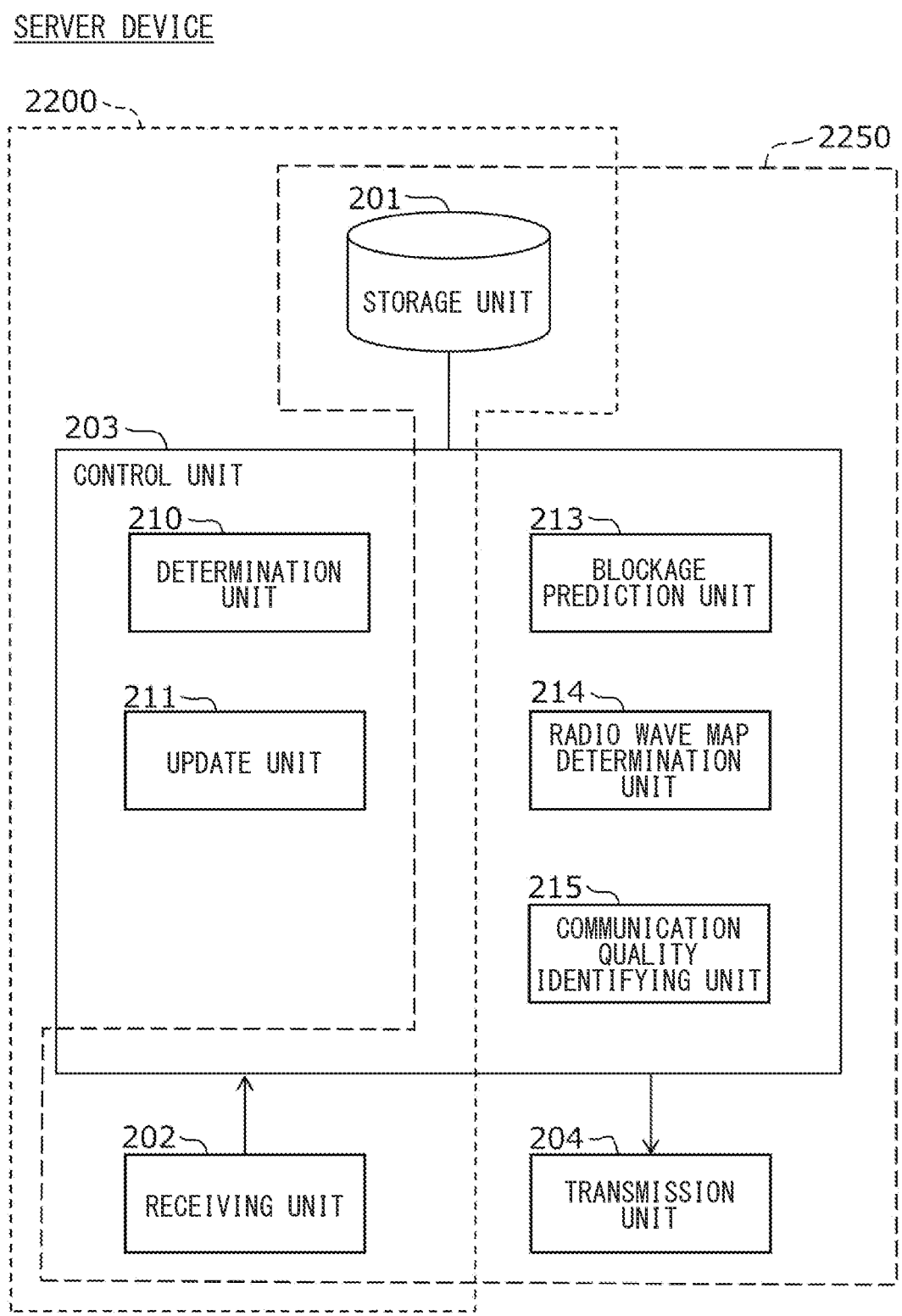
FIG. 9 is a block diagram illustrating a radio wave map update device and a radio wave map provider device which are in-vehicle devices of the second embodiment.

Configurations of the server device of the present embodiment will be described with reference to FIG. 9. As shown in FIG. 9, the server device of the present embodiment does not include the radio wave map extraction unit 212 unlike the server device shown in FIG. 5. Instead, the server device of the present embodiment includes the blockage prediction unit 213, the radio wave map determination unit 214, and the communication quality identifying unit 215. The configurations of the radio wave map update device 2200 of the present embodiment are the same as the radio wave map update device 1200 of the first embodiment, and the explanation is omitted. The radio wave map provider device 2250 (corresponding to "communication quality identifying device") of the present embodiment will be described. The radio wave map provider device 2250 of the present embodiment is a device for identifying the communication quality depending on the blockage situation, and accordingly it may be referred to as a communication quality identifying device.

The receiving unit 202 of the radio wave map provider device 2250 of the present embodiment is configured to receive the planned position information of the vehicle from the radio wave map user device 2150. That is, the receiving unit 202 of the present embodiment also functions as the planned position information acquiring unit.

The blockage prediction unit 213 is configured to: predict, based on the planned position information of the vehicle received by the receiving unit 202 and the planned position information of the other vehicle, the occurrence of the blockage of the communication between the wireless communication unit 102 of the vehicle and the base station caused by the movable blocker such as the other vehicle; predict the blockage situation (i.e. the predicted blockage situation); and generate the predicted blockage information. The method for predicting the blockage by the blockage prediction unit 213 of the present embodiment is the same as the first embodiment. Since the server device collects a huge amount of probe information from vehicles, roadside units, and the like, and accumulate the probe information, the server device may predict the occurrence of the blockage and the blockage situation more accurately than the case where the in-vehicle device predicts the blockage.

The radio wave map determination unit 214 is configured to determine the reference position information of the radio wave map corresponding to the planned position information received by the receiving unit 202. The radio wave map determination unit 214 is further configured to determine the reference blockage information indicating the reference blockage situation corresponding to the predicted blockage situation predicted by the blockage prediction unit 213.

The communication quality identifying unit 215 is configured to identify the reference communication quality information stored in association with the reference position information and the reference blockage information determined by the radio wave map determination unit 214.

The transmission unit 204 is configured to transmit the reference communication quality information identified by the communication quality identifying unit 215 to the radio wave map user device 2150.

Figure 10:
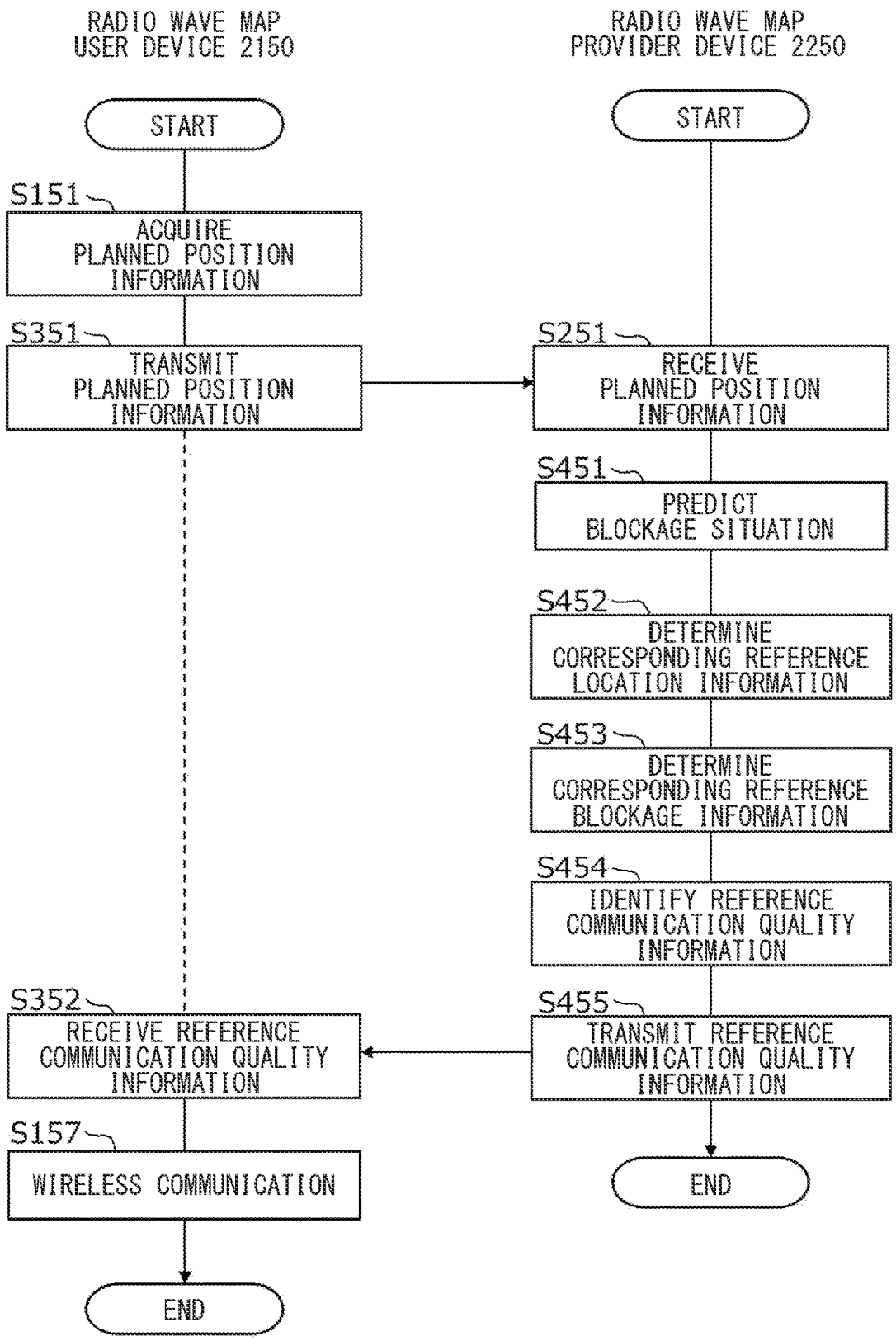
FIG. 10 is a flowchart showing operations of the radio wave map user device and the radio wave map provider device according to the second embodiment.

(3) Operations of the Radio Wave Map Provider Device 2250 and the Radio Wave Map User Device 2150 in the Radio Wave Map Using Process The operations of the radio wave map provider device 2250 and the radio wave map user device 2150 in the radio wave map using process of the present embodiment will be described with reference to the flowchart shown in FIG. 10. The radio wave map generation process of the present embodiment is the same as the radio wave map generation process of the first embodiment, and the explanation is omitted.

In S351, the radio wave map user device 2150 of the present embodiment transmits the planned position information acquired in S151 to the radio wave map provider device 2250.

In S251, the receiving unit 202 of the radio wave map provider device 2250 receives the planned position information. In S451, the blockage prediction unit 213 predicts the occurrence of the blockage of the communication between the wireless communication unit 102 of the vehicle and the base station caused by the movable blocker (for example, another vehicle) and the blockage situation based on the planned position information received in S251 and the planned position information of the other vehicle. In S452, the reference position information corresponding to the planned position information received in S251 is determined. In S453, the reference blockage information indicating the reference blockage situation corresponding to the blockage situation predicted in S451. In S454, the reference communication quality information corresponding to the reference position information determined in S452 and the reference blockage information determined in S453 is identified. In S455, the reference communication quality information identified in S454 is transmitted to the radio wave map user device 2150.

In S352, the receiving unit 108 of the radio wave map user device 2150 receives the reference communication quality information from the radio wave map provider device 2250. In S157, the communication control unit 114 controls the wireless communication performed by the wireless communication unit 102 based on the received reference communication quality information.

As described above, in the present embodiment, the radio wave map user device 2150 does not predict the blockage at the planned position of the vehicle, determine the blockage situation corresponding to the predicted blockage situation, and identify the reference communication quality information. These processes are performed by the radio wave map user device 2250. As a result, the processing load on the in-vehicle device can be reduced. Further, since the server device collects and accumulates the probe information and traveling schedule from many vehicles, the prediction of the blockage based on the accumulated data can be more accurate.

4. General Overview

The features of the probe information transmitter, the radio wave map update device, the radio wave map provider device, and the radio wave map user device according to the embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms first, second, and N-th (N is an integer) used in each embodiment and the claims are used to distinguish two or more configurations of the same type and two or more methods of the same type and do not limit the order and superiority and inferiority.

Although each embodiment is premised on the probe information transmitter and the radio wave map user device mounted on the vehicles, the present disclosure includes dedicated or general-purpose devices other than devices for vehicles, unless otherwise limited in the claims.

In the above-described embodiment, the probe information transmitter and the radio wave map user device are mounted on a vehicle. However, the devices may be carried by a pedestrian.

Further, examples of forms of the device of the present disclosure include the following. Examples of a form of a component include a semiconductor element, an electronic circuit, a module, and a microcomputer. Examples of a form of a semifinished product include an electronic control device (electronic control unit (ECU)) and a system board. Examples of a form of a finished product include a cellular phone, a smartphone, a tablet computer, a personal computer (PC), a workstation, and a server. Further, the security management device may be a device having a communication function such as a video camera, a still camera, a car navigation system.

Each device may additionally include necessary functions such as an antenna and a communication interface.

The radio wave map update device and the radio wave map provider device of the present disclosure are assumed to be used for the purpose of providing various services. In conjunction with providing such services, the device of the present disclosure may be used, the method of the present disclosure may be used, or/and the program of the present disclosure may be executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

The probe information transmitter and the radio wave map user device according to the present disclosure have been described mainly as a vehicle use purpose electronic control unit mounted on vehicle. The probe information transmitter and the radio wave map user device may also be applied to general moving bodies such as pedestrians, motorcycles, bicycles with electric motors, railways, ships, and aircrafts. In addition, the log management device may also be applied to devices used for various purposes such as mobile phones, tablets, and gaming machines.

What is claimed is:

1. A radio wave map update device comprising:
    at least one of (i) a circuit and (ii) a processor with a memory storing computer program code executable by the processor, the at least one of the circuit and the processor configured to cause the radio wave map update device to function as:
    a storage unit that stores a radio wave map that contains reference position information indicating a reference position,
        reference blockage information indicating a reference blockage situation of a communication with a first base station at the reference position, and
        reference communication quality information of a communication with the first base station or a second base station under the reference blockage situation at the reference position;
    a receiving unit that receives communication quality information of the communication between a probe information transmitter mounted in a moving body and the first base station or the second base station; and
    an update unit that updates the reference communication quality information stored in the storage unit using the communication quality information;
    wherein:
    the receiving unit receives, from the probe information transmitter, probe information that contains location information indicating a position of the moving body, and blocking cause information indicating a movable blocker that blocks the communication between the probe information transmitter and the first base station;
    the at least one of the circuit and the processor are further configured to cause the radio wave map update device to function as a determination unit that determines the reference position information corresponding to the location information, and the reference blockage information that indicates the reference blockage situation corresponding to a blockage situation of the communication between the probe information transmitter and the first base station caused by the blocker indicated by the blocking cause information; and
    the update unit updates the reference communication quality information corresponding to the reference position information and the reference blockage information.

2. The radio wave map update device according to claim 1, wherein
    the reference blockage information contains information indicating the first base station, whose communication is blocked at the reference position, and the second base station, whose communication is not blocked at the reference position.

3. The radio wave map update device according to claim 1, wherein
the reference blockage information contains blocker type information indicating a type of a reference blocker that blocks the communication with the first base station.

4. The radio wave map update device according to claim 1, wherein
the reference blockage information contains reference blocked antenna information indicating a reference antenna, among a plurality of reference antennas used for communication at the reference position, whose communication with the first base station is blocked.

5. The radio wave map update device according to claim 1, wherein
the blocking cause information is image information of surroundings of the moving body.

6. The radio wave map update device according to claim 1, wherein
the probe information further contains the communication quality information, and
the receiving unit receives the communication quality information contained in the probe information from the probe information transmitter.

7. The radio wave map update device according to claim 1, wherein
the receiving unit receives the communication quality information from the first base station or the second base station.

8. A radio wave map update method performed by a radio wave map update device, wherein
the radio wave map update device includes at least one of (i) a circuit and (ii) a processor with a memory storing computer program code executable by the processor, the at least one of the circuit and the processor configured to cause the radio wave map update device to function as a storage unit that stores a radio wave map that contains
reference position information indicating a reference position,
reference blockage information indicating a reference blockage situation of a communication with a first base station at the reference position, and
reference communication quality information of a communication with the first base station or a second base station under the reference blockage situation at the reference position,
the radio wave map update method comprises:
receiving communication quality information of the communication between a probe information transmitter mounted in a moving body and the first base station or the second base station;
updating the reference communication quality information stored in the storage unit using the communication quality information;
receiving, from the probe information transmitter, probe information that contains location information indicating a position of the moving body, and blocking cause information indicating a movable blocker that blocks the communication between the probe information transmitter and the first base station;
determining the reference position information corresponding to the location information, and the reference blockage information that indicates the reference blockage situation corresponding to a blockage situation of the communication between the probe information transmitter and the first base station caused by the blocker indicated by the blocking cause information; and
updating the reference communication quality information corresponding to the reference position information and the reference blockage information.

9. A communication quality identifying device comprising:
at least one of (i) a circuit and (ii) a processor with a memory storing computer program code executable by the processor, the at least one of the circuit and the processor configured to cause the communication quality identifying device to function as:
a storage unit that stores a radio wave map that contains
reference position information indicating a reference position,
reference blockage information indicating a reference blockage situation of a communication with a first base station at the reference position, and
reference communication quality information of a communication with the first base station or a second base station under the reference blockage situation at the reference position;
a planned position information acquiring unit configured to acquire planned position information that indicates a planned position of a moving body in which a radio wave map user device configured to communicate with the first base station or the second base station is mounted;
a blockage prediction unit that
predicts an occurrence of blockage of a communication between the radio wave map user device and the first base station caused by a movable blocker, which is different from the moving body, at the planned position information, and
generates predicted blockage information indicating a predicted blockage situation of the blockage;
a radio wave map determination unit that
determines the reference position information corresponding to the planned position information, and
determines the reference blockage information indicating the reference blockage situation corresponding to the predicted blockage situation; and
a communication quality identifying unit that identifies the reference communication quality information corresponding to the reference position information and the reference blockage information.

10. The communication quality identifying device according to claim 9, wherein
the communication quality identifying device is included in the radio wave map user device,
the at least one of the circuit and the processor are further configured to cause the communication quality identifying device to function as:
a receiving unit that receives the radio wave map from a radio wave map provider device configured to communicate with the radio wave map user device; and
a communication control unit that controls a communication of the radio wave map user device at the planned position based on the reference communication quality information identified by the communication quality identifying unit.

11. The communication quality identifying device according to claim 9, wherein
the communication quality identifying device is included in a radio wave map provider device configured to communicate with the radio wave map user device, and
the planned position information acquiring unit acquires the planned position information from the radio wave map user device,
the at least one of the circuit and the processor are further configured to cause the communication quality identifying device to function as:
a transmission unit that transmits the reference communication quality information identified by the communication quality identifying unit to the radio wave map user device.

12. The communication quality identifying device according to claim 9, wherein
the planned position information acquiring unit acquires second planned position information indicating a planned position of the blocker in addition to first planned position information that is the planned position information of the moving body, and
the blockage prediction unit predicts the blockage of the communication between the radio wave map user device and the first base station caused by the blocker based on the first planned position information and the second planned position information.

13. The communication quality identifying device according to claim 9, wherein
the reference blockage information contains information indicating the first base station, whose communication is blocked at the reference position, and the second base station, whose communication is not blocked at the reference position,
the radio wave map determination unit determines that the reference blockage situation corresponds to the predicted blockage situation when the blockage prediction unit predicted that
the blocker blocks the communication between the radio wave map user device and the first base station at the planned position, and
the blocker does not block the communication between the radio wave map user device and the second base station at the planned position.

14. The communication quality identifying device according to claim 9, wherein
the reference blockage information contains blocker type information indicating a type of a reference blocker that blocks the communication with the first base station, and
the radio wave map determination unit determines that the reference blockage situation corresponds to the predicted blockage situation when the blockage prediction unit predicted that a type of the blocker matches the type of the reference blocker.

15. The communication quality identifying device according to claim 9, wherein
the reference blockage information contains reference blocked antenna information indicating a reference antenna, among a plurality of reference antennas used for communication at the reference position, whose communication with the first base station is blocked,
the blockage prediction unit predicts a blocked antenna whose communication is blocked by the blocker among a plurality of antennas of the radio wave map user device, and
the radio wave map determination unit determines that the reference blockage situation corresponds to the predicted blockage situation when the blockage prediction unit predicted that the blocked antenna matches the reference antenna.

\* \* \* \* \*